United States Patent [19]

Peterson et al.

[11] Patent Number: 4,518,047
[45] Date of Patent: May 21, 1985

[54] TOOL BAR WITH SLIDABLY INSERTABLE BALLAST BLOCK

[75] Inventors: Richard L. Peterson, Le Sueur; Roger J. Scheurer, Kasota, both of Minn.

[73] Assignee: Hiniker Company, Mankato, Minn.

[21] Appl. No.: 410,653

[22] Filed: Aug. 23, 1982

[51] Int. Cl.³ .............................................. A01B 23/04
[52] U.S. Cl. ................................................. 172/611
[58] Field of Search ............... 172/611, 790; 280/755, 280/758, 759; 414/719; 52/605, 608, 609, 722, 725

[56] References Cited

U.S. PATENT DOCUMENTS

| 818,884 | 4/1906 | Grimm | 52/722 X |
|---|---|---|---|
| 828,575 | 8/1906 | Schilling | 172/611 X |
| 1,051,811 | 1/1913 | Jikihara | 172/611 |
| 1,067,677 | 7/1913 | Presnell | 172/611 X |
| 1,071,045 | 8/1913 | Graa | 52/722 |
| 1,078,338 | 11/1913 | Downie | 172/611 X |
| 1,084,727 | 1/1914 | Camden | 52/722 X |
| 1,153,952 | 9/1915 | Porter | 172/611 X |
| 1,228,811 | 6/1917 | Newman | 172/611 |
| 1,269,028 | 6/1918 | White | 172/611 X |
| 1,354,495 | 10/1920 | Larsen | 172/611 X |
| 1,446,796 | 2/1923 | Henderson | 52/605 |
| 1,537,412 | 5/1925 | Dafferner | 172/611 X |
| 1,579,297 | 4/1926 | Franklin | 172/611 X |
| 1,901,299 | 3/1933 | Johnson | 172/536 |
| 2,164,220 | 6/1939 | Nash | 172/611 X |
| 2,490,904 | 12/1949 | Gustafson | 172/611 |
| 2,634,663 | 4/1953 | Curtis | 172/611 X |
| 2,864,181 | 12/1958 | Simmons | 172/611 x |
| 3,480,294 | 11/1969 | Lichti | 172/611 X |
| 4,081,035 | 3/1978 | Bowen | 172/611 X |

Primary Examiner—Richard T. Stouffer
Attorney, Agent, or Firm—Burd, Bartz & Gutenkauf

[57] ABSTRACT

Ballast blocks are located within a tool bar of an agricultural implement to increase its weight. Modular blocks of concrete are inserted into the tool bars and held by end retainers. The blocks are provided with bevels and notches for cooperation with an extractor to simplify removal of blocks when this is desired.

25 Claims, 9 Drawing Figures

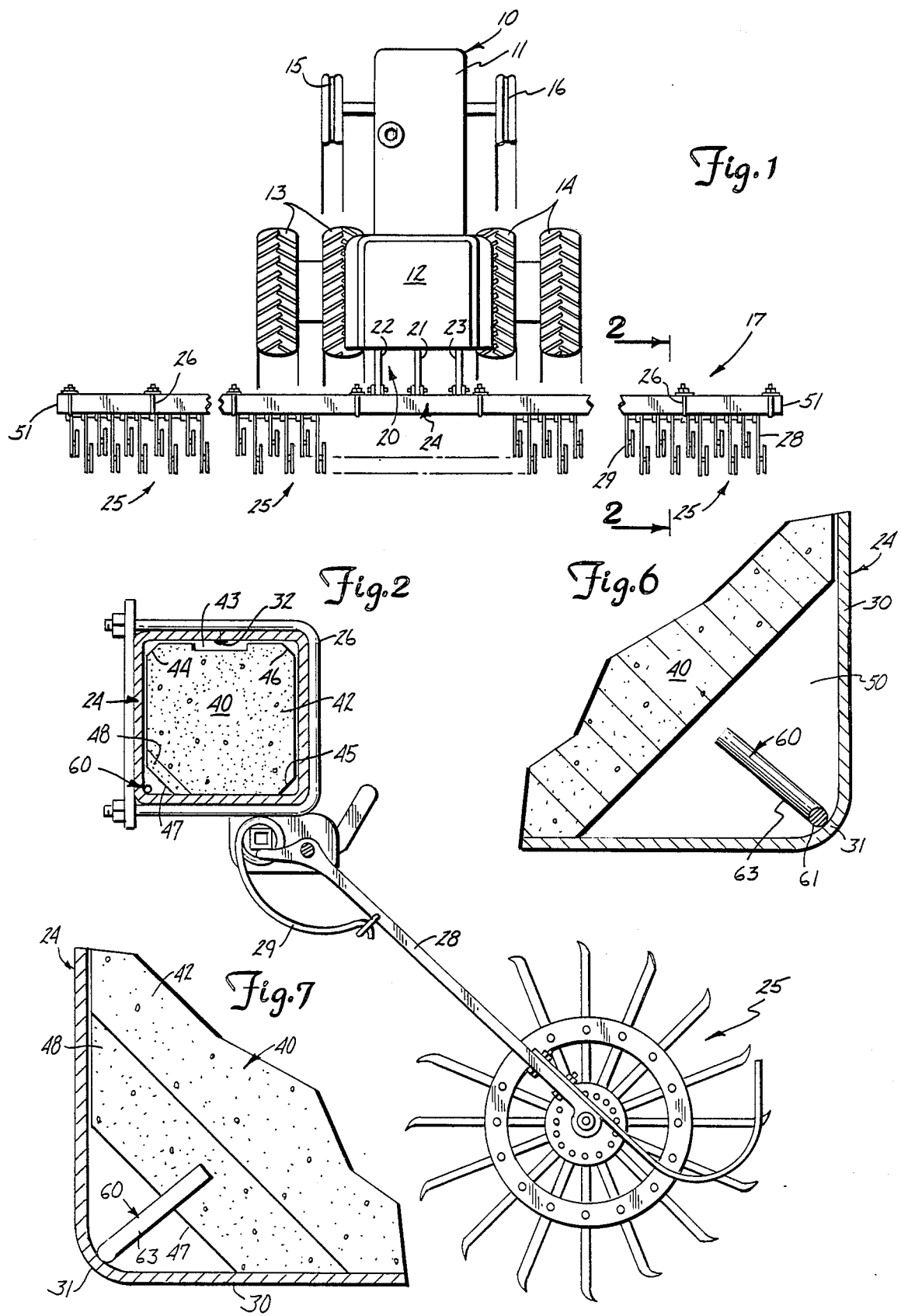

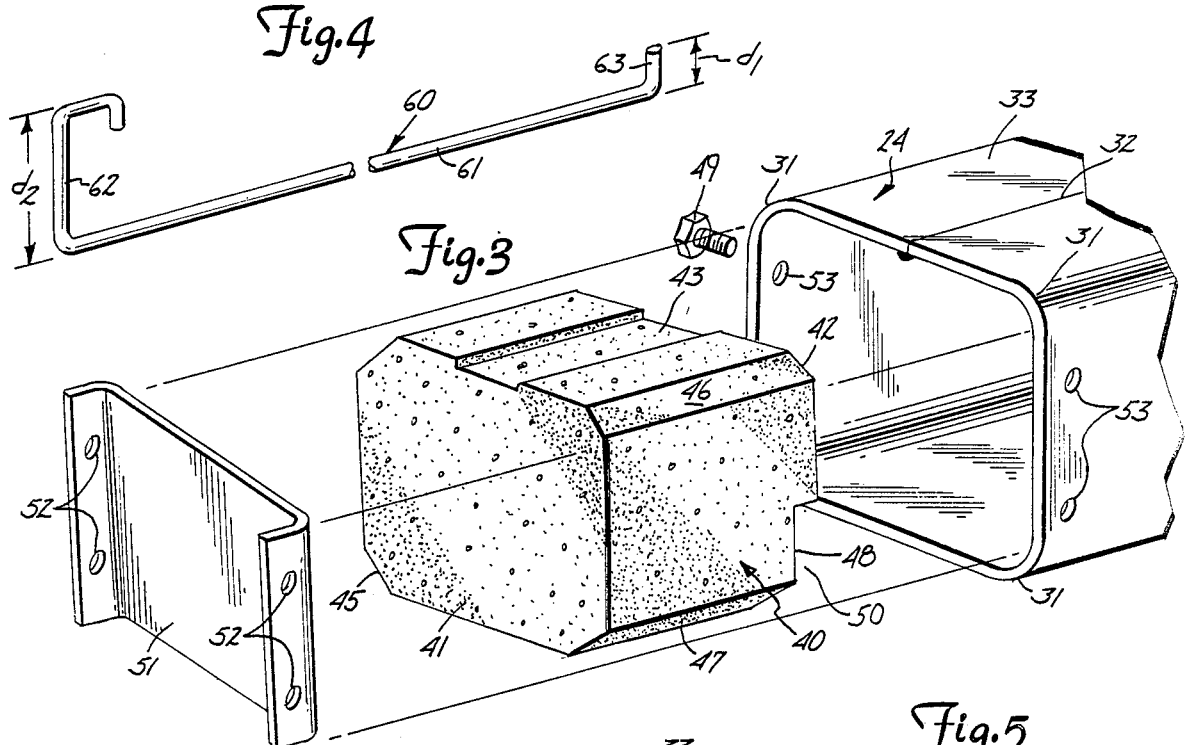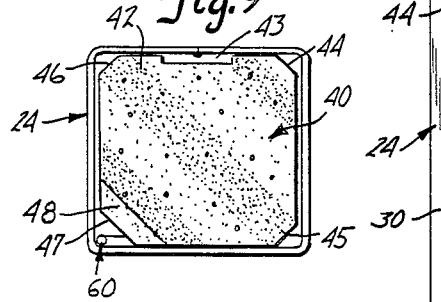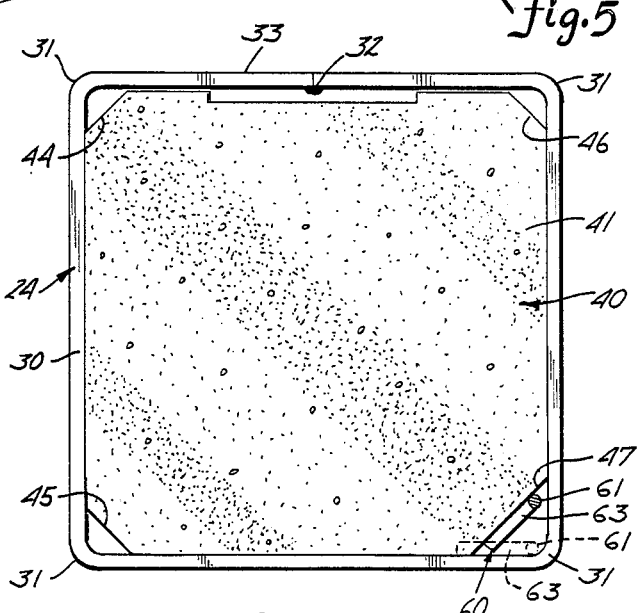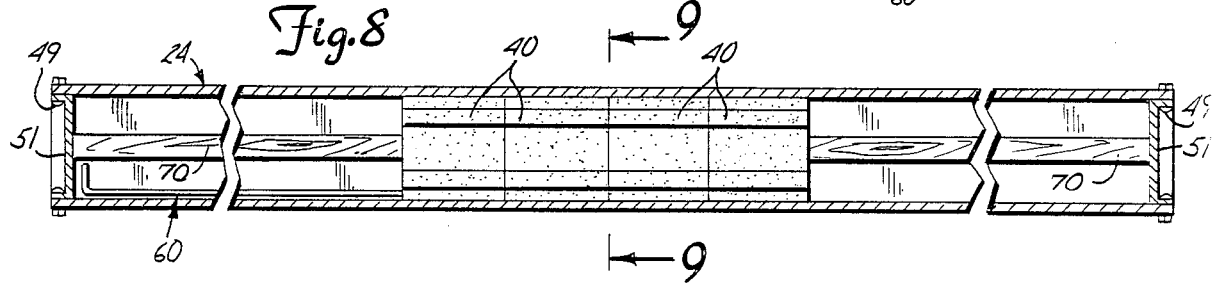

TOOL BAR WITH SLIDABLY INSERTABLE BALLAST BLOCK

TECHNICAL FIELD

This invention relates to the field of agricultural implements, and more expecially to weight means for adjusting the operation of agricultural implements in accordance with the tillage characteristics of various soils.

BACKGROUND OF INVENTION

It is well known that earthworking, planting, and cultivating implements used in agriculture act differently in different soils, and that one of the keys to optimum use of these implements lies in correlating their weight with the characteristics of the soil being worked. Numerous ways for adjusting the weight of an implement, by designing the implement for minimum useful weight and then adding or removing extra weights as necessary, are known. A rudimentary example of this is found in Larsen U.S. Pat. No. 1,354,495, where weight is increased as desired by adding a filler 26 to a box 25 carried by the implement.

Many modern implements have their earthworking tools, such as chisels, rollers, and hoes, mounted on tool bars extending transversely of the path of the implement. The tool bars may be continuous, or, for longer spreads, may be hinged. They are usually of steel tubing, generally of rectangular section for security of tool attachment.

The attachment of additional weights to this structure in a stable fashion, and the variation of the added weight with changes in the soil being worked, have not heretofore been convenient.

SUMMARY OF INVENTION

The invention relates to ballast means for agricultural implements to increase the weight of the implement. According to the invention, the ballast means comprises a plurality of ballast blocks dimensioned to be slidably inserted into the passage of a tool bar of an agricultural implement, such as an earthworking implement. Each ballast block is a body of dense material having channel means extended the longitudinal length of the block. The channel means is open to a notch in the block. An extractor extends through a passage formed by the channel means and the tool bar to the notch. The extractor has an end that is locatable in the notch and is engageable with a block so that when the extractor is pulled one or more blocks can be extracted from the tool bar. Retaining means attached to the tool bar are used to hold the ballast blocks in the tool bar. Elongated spacers can be used to centrally position ballast blocks in the tool bar.

The ballast blocks are modular bodies of concrete having a generally rectangular shape. They are of a size to slidably fit into the passage of a tool bar, such as a rectangular tool bar. The number of blocks that are inserted into a given tool bar is dependent on the desired weight of the tool bar, as required by the conditions of the soil. The tool bar weight can be increased or decreased by adding or subtracting ballast blocks from the tool bar. This is accomplished with a minimum of time and effort in the field.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE DRAWING

In the drawing, in which like reference numerals indicate corresponding parts throughout the several views, FIG. 1 is a foreshortened plan view of an earthworking agricultural implement equipped with the tool bar of the invention;

FIG. 2 is an enlarged sectional view taken along line 2—2 of FIG. 1;

FIG. 3 is an exploded perspective view of the right end of the tool bar and a block;

FIG. 4 is a foreshortened perspective view of the extractor used to insert and move the ballast blocks from the tool bar;

FIG. 5 is an end view of the tool bar accommodating a ballast block;

FIG. 6 is an enlarged sectional view of a corner of the tool bar and extractor tool used to insert a ballast block into the tool bar;

FIG. 7 is a fragmentary end view of the notch corner of the inside end of the ballast block;

FIG. 8 is a foreshortened longitudinal sectional view of a modification of the tool bar accommodating a plurality of centrally located ballast blocks; and FIG. 9 is an enlarged sectional view taken along the line 9—9 of FIG. 8.

DESCRIPTION OF PREFERRED EMBODIMENT

Referring to the drawing, there is shown in FIG. 1 an agricultural tractor 10 having an engine 11 located forwardly of a driver's cab 12. Left and right pairs of drive wheels 13 and 14 are operably connected to the engine. The front of tractor 10 is supported by a pair of steerable wheels 15 and 16.

An earthworking implement, known as a rotary hoe, indicated generally at 17, is mounted on a three-point hitch 20 at the rear of the tractor. Hitch 20 has a conventional control link 21 and draft links 22 and 23 which are connected to a transverse tool bar 24 of implement 17. Tool bar 24 may be unitary, or if relatively long may be made of lateral and central rigid sections hinged together for folding into a transport configuration.

Earthworking tools or hoe assemblies indicated generally at 25 are mounted along the length of tool bar 24 by a plurality of U-bolts 26. Each hoe assembly has a wheel 27 carried by a mounting arm 28. Alternate arms 28 have different lengths to stagger the wheels 27.

A spring 29 biases arm 28 in a downward direction to retain wheel 27 in its ground working position. The structure and operation of the rotary hoe earthworking tool is disclosed in U.S. Pat. No. 4,466,492, entitled Earthworking Implement. The rotary hoe implement of this patent is incorporated herein by reference. The earthworking tool mounted on tool bar 24 can be a curved spring used in a field cultivator as disclosed in U.S. Pat. No. 4,428,437, entitled Mount Assembly, and in U.S. Pat. No. 4,425,972, entitled Trip Assembly.

As shown in FIGS. 2, 3, and 5, tool bar 24 comprises a metal tube 30 of rectangular cross section having rounded corners 31 and a butt weld 32 extending the length of the top wall or face 33. The flash of weld 32 extends inward of the tube and forms an elongated longitudinal bead. The space within the tube is adapted to slidingly receive a number of weight or ballast blocks 40, which according to the invention are made modular or of standard cross section and of standard length, and thus of identical mass. Blocks 40 are one-piece bodies cast from concrete, and are generally of rectangular body configuration. Block 40 can be made of other dense material, as metal. Each block has a flat transverse outer end 41 and inner end 42. The sides, top and bottom of each block 40 are located in close relation to the inside surfaces of tool bar 24. The bottom of each block 40 is supported on the bottom wall of the tool bar 24. The top of the block 40 has a longitudinal recess or groove 43 to avoid interference with weld 32. The longitudinal corners of each block 40 have bevels 44, 45, and 46 to avoid interference with round corners 31 of tool bar 24. The fourth corner has a large bevel of channel 47, which terminates at one end in a notch 50 for a purpose presently to be set forth. Notch 50 is a large bevel located at the lower inside corner of block 40. Block 40 has a diagonal shoulder 48 providing a transverse wall of notch 50.

The ends of tool bar 24 are removably closed with plate retainers 51, secured by bolts 49 passing through holes 52 in the side flanges of the retainers 51 and holes 53 in bar 24, or by more quickly releasable fasteners. Retainers 51 fit into the ends of the passage of tool bar 24 and serve as stops to hold the blocks 40 within tool bar 24.

While it is not difficult to increase the implement weight by loading as many blocks 40 into tool bar 24 as may be desired, removing the blocks to decrease the implement weight would be less convenient, and an extractor 60 is provided for this purpose. As shown in FIG. 4, extractor 60 comprises a rod 61 extending from a handle 62 at one end to a shorter contact arm 63 at the other end. Handle 62 and arm 63 lie in a common plane, the dimension $d_1$ of arm 63 is slightly less than the width of a block bevel 47, and the dimension $d_2$ of handle 62 is less than the internal side of tool bar 24. The length of extractor 60 is generally about one-half the internal length of tool bar 24. Extractor 60 can have a length equal to the length of tool bar 24.

To use the invention, the user decides which end of the tool bar 24 is to be made available for loading and unloading and removes retainer 51 at that end. Blocks 40 are now loaded into tube 30, one after another, always in the same orientation, that is, always with face 41 preceding face 42, and with wide bevels 47 at the same corner of the tube. When the tube 30 is substantially full of blocks 40, an extractor 60 is inserted into tube 30 by positioning arm 63 generally parallel to wide bevel 47 and sliding the extractor into the passage 49 defined by bevel 47 and the adjacent corner of the tube 30, as shown in FIG. 5. When the extractor 60 is fully inserted, arm 63 enters notch 50 of the innermost block, and the extractor can be allowed to pivot so that the plane of arm 63 and handle 62 lies on the inner surface of the tube 30, as shown in phantom in FIG. 5. It is understood that sufficient space should be allowed at the loading end of the tube to accommodate handle 62. Retainers 51 are inserted into the ends of tube 30 and secured thereto with bolts 49.

When it is desired to remove blocks, retainer 51 is removed from the unloading end of tube 30, handle 62 of extractor 60 is grasped and the extractor is withdrawn, moving past notches 50 in successive blocks. If it is desired to remove only the outermost block, the extractor is withdrawn until arm 63 is in line with notch 50 of that single block, the extractor is rotated until arm 63 extends into notch 50 as shown in FIGS. 6 and 7, and engages shoulder 48 of that block. A simple pull-on handle 62 or rod 61 draws the block 40 from the tube. If more than one block is to be removed, the extractor is withdrawn the appropriate distance for arm 62 to reach the notch 50 of the innermost block to be removed. However, if all blocks are to be removed, it may be more appropriate because of the friction forces involved to do so in several steps. Whether or not blocks are in tube 30, the extractor 60 should be stored there habitually for easy access.

To avoid the need for very long extractors, it may be preferred to load the tuube so that half of the blocks 40 may be removed from each end, in which case two extractors, each of half the tube length, and inserted from opposite ends and stored in the tube for use as described.

It will be appreciated that the use of an extractor 60 is a convenience, but not a necessity. The blocks can be removed without an extractor by removing both retainers and pushing the blocks out of one end of the tube 30 by a timber applied at the other end of the tube. Alternatively, the blocks 40 may be provided with notches 50 at both ends of bevels 47.

It is frequently desired that the added weight be concentrated at some particular location in the tube 30, as at its center. FIGS. 8 and 9 show that members having less weight than blocks 40, such as two-by-fours 70, may be inserted in the tube 30 and held against the blocks 40 by retainers 51, to give the desired lateral stabilizing affect.

From the above, it is evident that the invention comprises an apparatus and a system for conveniently varying the weight of an agricultural implement by increasing or decreasing the number of modular weight blocks 40 contained in the implements and tool bar 24.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or privalege is claimed are defined as follows:

1. In an earth working implement: a tool bar having a generally rectangular inside wall defining a passage, ballast block slidably insertable into said passage of the tool bar to increase the weight of the tool bar, said block comprising a one-piece body of dense material, said body having a rectangular shape with longitudinal corners and side wall means locatable adjacent the inside wall of the tool bar whereby the body slidably fits into said passage, each of said corners having a beveled edge, said side wall means having a longitudinal groove between adjacent corners to accommodate portions of the tool bar, said body having opposite ends, one of said ends having a notch open to a corner of the body, and channel means provided by a beveled edge of one corner of the body extended from said notch in one of said ends to the opposite end thereof to accommodate a tool used to remove the body from the tool bar, and means retaining said block in said passage of the tool bar.

2. The structure of claim 1 wherein: said ends of the body are generally flat.

3. The structure of claim 1 wherein: said body is concrete.

4. The structure of claim 1 wherein: the adjacent side wall means of the body are normally disposed relative to each other.

5. In an agricultural implement: a tool bar having a longitudinal passage along the length thereof, a plurality of ballast blocks slidably insertable into said passage of the tool bar to increase the weight of the tool bar, each of said blocks having side walls locatable adjacent the inside of the tool bar whereby each block slidably fits into said passage, each block having opposite ends, one of said ends having a notch, and channel means extended from said notch in one of said ends to the opposite end thereof, and means retaining said block in said passage of the tool bar.

6. The structure of claim 5 wherein: each block is generally rectangular and has a longitudinal corner, said channel means comprises a bevel extended along said one longitudinal corner of the block.

7. The structure of claim 5 wherein: each block has an outside surface having a longitudinal groove.

8. The structure of claim 5 wherein: each block has a generally rectangular shape with longitudinal corners, each of said corners having a beveled edge.

9. The structure of claim 8 wherein: one of said beveled edges comprises a channel open to said notch.

10. The structure of claim 9 wherein: each block has a corner, said notch being located in said corner.

11. The structure of claim 5 wherein: said ends of the block are generally flat.

12. The structure of claim 5 wherein: each block is a concrete block.

13. The structure of claim 5 wherein: the adjacent side walls of each block are normally disposed relative to each other.

14. In an earth working implement: a tool bar having a longitudinal passage along the length thereof, a plurality of ballast blocks slidably insertable into said passage of the tool bar to increase the weight of the tool bar, each block having a body having opposite ends, a notch, and channel means extended from said notch to one of the ends of the body, and means retaining said blocks in said passage of the tool bar.

15. The structure of claim 14 including: an extractor located in said passage of the tool bar adjacent said blocks, said extractor having means engageable with one of said blocks whereby the extractor is useable to pull said blocks from said tool bar.

16. The structure of claim 15 wherein: said extractor comprises an elongated rod having a first turned end engageable with one of said blocks, and a second turned end adapted to facilitate the pulling of the extractor and blocks from the tool bar.

17. The structure of claim 14 wherein: said means for retaining said blocks in said passage of the tool bar comprise retainers removably secured to the ends of said tool bar.

18. The structure of claim 32 including: means for centering said blocks in the center portion of said passage of the tool bar.

19. The structure of claim 18 wherein: said means for centering said blocks in said passage of the tool bar comprises elongated linear members located in said passage and engageable with said blocks, and the means for retaining the blocks in said passage.

20. The structure of claim 19 wherein: the means for retaining said blocks in said passage comprise retainer plates secured to opposite ends of said tool bar.

21. The structure of claim 14 wherein: each block is generally rectangular and has a longitudinal corner, said channel comprises a bevel extended along said one longitudinal corner of the block.

22. The structure of claim 14 wherein: each block has an outside surface having a longitudinal groove.

23. A structure of claim 14 wherein: each block has a generally rectangular shape with longitudinal corners, each of said corners having a beveled edge, one of said beveled edges and said tool bar forming said channel means open to said notch.

24. The structure of claim 14 wherein: said body has a generally rectangular shape with longitudinal corners and side wall means located adjacent the inside wall of the tool bar whereby the body slidably fits into the passage, each of the corners of the body has a beveled edge, said side wall means having a longitudinal groove between adjacent corners to accommodate portions of the tool bar, said body having opposite ends, one of said ends having said notch open to corner of the body, and said channel means being provided by a beveled edge of one of the corners of the body.

25. The structure of claim 14 wherein: each block has a corner, said notch being located in said corner.

* * * * *

UNITED STATES PATENT AND TRADEMARK OFFICE
CERTIFICATE OF CORRECTION

PATENT NO. : 4,518,047

DATED : May 21, 1985

INVENTOR(S) : Richard L. Peterson et al

It is certified that error appears in the above-identified patent and that said Letters Patent is hereby corrected as shown below:

Column 3, line 19, "of" should be -- or --.

Column 4, line 17, "tuube" should be -- tube --.

Column 6, claim 18, line 1, "claim 32" should be -- claim 14 --.

Signed and Sealed this

Tenth Day of September 1985

[SEAL]

Attest:

DONALD J. QUIGG

Attesting Officer    Acting Commissioner of Patents and Trademarks - Designate